UNITED STATES PATENT OFFICE.

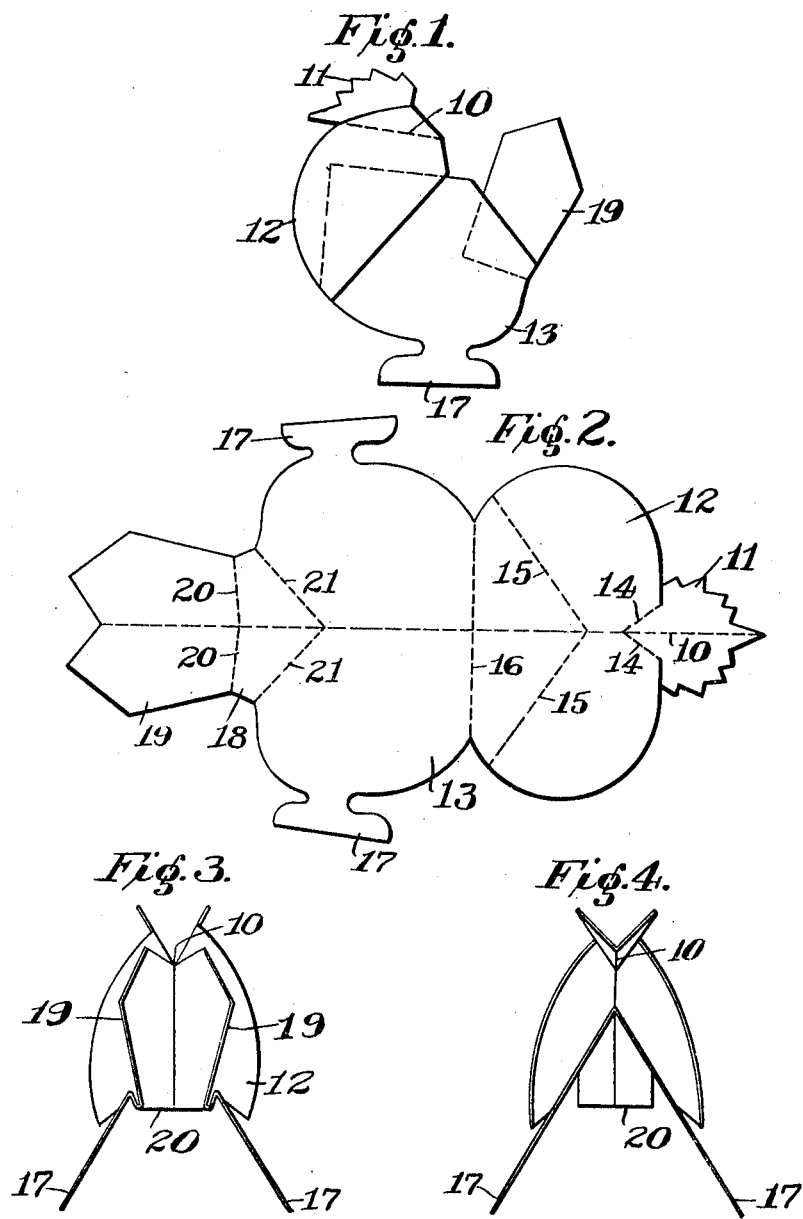

ALFRED JOSEPH FRUEH, OF NEW YORK, N. Y.

SHEET-MATERIAL SCULPTURE.

1,317,016.  Specification of Letters Patent.  Patented Sept. 23, 1919.

Application filed December 20, 1915. Serial No. 67,858.

*To all whom it may concern:*

Be it known that I, ALFRED J. FRUEH, a citizen of the United States, residing at the city of New York, in the borough of Manhattan and State of New York, have invented certain new and useful Improvements in Sheet-Material Sculptures, of which the following is a specification, reference being had therein to the accompanying drawing.

My invention relates to improvements in sheet-material sculpture, and has for its object to provide a structure designed and cut or stamped from a single sheet of suitable foldable material and forming a single blank, which blank being folded upon itself forms a representation of a fowl or other animal in contour, with some provision for relief, and having pedal terminals enabling it to stand erect.

In the drawings—

Figure 1 is a side elevation of a structure embodying my invention.

Fig. 2 is a plan of the blank in its flat and unfolded condition from which the structure illustrated in Fig. 1 is produced by folding along the dotted lines shown in Fig. 2.

Fig. 3 is a rear elevation of the structure shown in Fig. 1.

Fig. 4 is a front elevation of said structure.

In my invention I employ a sheet of foldable material from which is cut or stamped a blank such as is shown in Fig. 2, whereof the median line is indicated by the dotted line 10. The head-section 11 is connected to the body-section 13 by the intermediate-section or neck-section 12, foldable on the lines 14—14, 15—15 and 16 to produce the structure shown in Figs. 1, 3 and 4; the body section terminating in the feet 17—17 upon which the folded and completed structure stands upright.

Thus far, this description applies to any embodiment of my invention which represents an animal having no tail; the head-section 11 being contoured in simulation of the head of any desired bird or beast; the body-section 13 being similarly appropriately contoured and provided with feet 17—17 upon which the folded structure will stand erect without extraneous supporting means; and the neck-section 12 being so contoured and folded on such lines as to appropriately represent the neck of the animal and, when folded, to carry the head 11 at a predetermined angle to the plane of the surface whereon the feet 17—17 rest.

I have selected for the purpose of illustrating this application, however, a fowl; and the tail-section 19, foldable on the median line 10, is connected to the body-section 13 by the intermedial-section 18, which is foldable both on the median line 10 and the transverse lines 20—20, and 21—21, to pitch the folded tail-section 19 at any desired angle to the plane of the supporting surface whereon the feet 17—17 rest.

I have found the described means capable of being employed in making representations of a wide range of subjects in animal life. The folded and completed subject stands erect, thus producing a life-like effect and lending itself to a great variety of purposes, of which window-dressing and children's toys may be mentioned as examples. Furthermore, the flat surfaces of the folded and completed structure are a convenient foundation for drawing and coloring the details of the fowl or other animal, which details are limited only by the limits of the surfaces and the degree of skill possessed by the artist. Said structures also lend themselves to a great scope of pictorial effect when grouped and photographed or otherwise reproduced. Groups of these structures depicting persons and animals are capable of effective use in producing cartoons, particularly cartoons of a humorous nature.

Having thus described my invention, what I claim as new and desire to have secured to me by grant of Letters Patent, is—

1. The improvement in sheet-material sculpture comprising a single sheet of material foldable upon a longitudinal median line and also foldable upon other lines of which some are disposed transversely and others disposed diagonally with reference to said median line to form a structure having a head-section, a body-section and an intermediate section.

2. The improvement in sheet-material sculpture comprising a single sheet of material foldable upon a longitudinal line, and also foldable upon other lines of which some are disposed transversely and others disposed diagonally in relation to said median line to produce a structure arranged to stand erect and having a head-section, a body-section, a tail-section, and sections connecting said body-section with said head-section and said tail-section.

3. The improvement in sheet material sculpture comprising a single sheet of material contoured to form a foldable blank having two projecting feet and parts which when folded form a head-section, a body-section, a tail-section and other sections between and connecting said head, body and tail-sections; said blank being foldable upon itself longitudinally upon a single straight median line to form with the folded sections thereof a structure arranged to stand erect upon said feet.

In testimony whereof I hereunto affix my signature.

ALFRED JOSEPH FRUEH.

Copies of this patent may be obtained for five cents each, by addressing the "Commissioner of Patents, Washington, D. C."